United States Patent
Watanabe

(10) Patent No.: US 10,248,103 B2
(45) Date of Patent: Apr. 2, 2019

(54) NUMERICAL CONTROLLER DYNAMICALLY SWITCHING TIME CONSTANT FOR ACCELERATION AND DECELERATION FILTER

(71) Applicant: FANUC Corporation, Minamitsuru-gun, Yamanashi (JP)

(72) Inventor: Mitsunori Watanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 90 days.

(21) Appl. No.: 15/630,315

(22) Filed: Jun. 22, 2017

(65) Prior Publication Data

US 2017/0371315 A1    Dec. 28, 2017

(30) Foreign Application Priority Data

Jun. 27, 2016  (JP) .................................. 2016-127050

(51) Int. Cl.
*G05B 19/31*  (2006.01)
*G05B 19/416* (2006.01)

(52) U.S. Cl.
CPC ......... *G05B 19/31* (2013.01); *G05B 19/4163* (2013.01); *G05B 2219/36507* (2013.01); *G05B 2219/43006* (2013.01)

(58) Field of Classification Search
None
See application file for complete search history.

(56) References Cited

U.S. PATENT DOCUMENTS

| 4,547,847 | A | * | 10/1985 | Olig | G05B 19/4163 318/561 |
| 5,159,254 | A | * | 10/1992 | Teshima | G05B 19/4063 318/610 |
| 5,256,951 | A | * | 10/1993 | Nashiki | G05B 19/4163 318/575 |
| 5,475,602 | A | * | 12/1995 | Otsuki | G05B 19/4103 318/573 |
| 5,952,804 | A | * | 9/1999 | Hamamura | G05B 19/237 318/560 |

(Continued)

FOREIGN PATENT DOCUMENTS

JP    03152604 A    6/1991
JP    6-95720 A     4/1994

(Continued)

OTHER PUBLICATIONS

Decision to Grant a Patent for Japanese Application No. 2016-127050, dated Aug. 21, 2018 with translation, 6 pages.

*Primary Examiner* — Ramesh B Patel
(74) *Attorney, Agent, or Firm* — RatnerPrestia

(57) ABSTRACT

A numerical controller looks ahead and analyzes commands indicated by a block contained in a program, and identifies a travel direction of a control target for each of the commands to calculate a time constant based on the identified travel direction. The numerical controller then sets a time constant for filter processing based on the time constant for each of the commands, and performs filter processing on command data subjected to a linear acceleration and deceleration process, based on the set time constant. The numerical controller then calculates movement of each axis for each interpolation period, based on the command data subjected to the filter processing.

4 Claims, 16 Drawing Sheets

(56) References Cited

U.S. PATENT DOCUMENTS

| | | | | |
|---|---|---|---|---|
| 6,404,160 B2* | 6/2002 | Sagasaki | ............... | G05B 19/18 |
| | | | | 318/560 |
| 7,155,303 B2* | 12/2006 | Sagasaki | ............ | G05B 19/4093 |
| | | | | 700/173 |
| 7,637,097 B2* | 12/2009 | Muraguchi | ............... | F01N 3/22 |
| | | | | 60/274 |
| 8,294,405 B2* | 10/2012 | Hoffmann | ............ | G05B 19/416 |
| | | | | 318/560 |
| 9,804,583 B2* | 10/2017 | Watanabe | ............ | G05B 19/416 |
| 2009/0248203 A1* | 10/2009 | Nakamura | ......... | G05B 19/4103 |
| | | | | 700/251 |
| 2009/0295323 A1* | 12/2009 | Papiernik | ............. | G05B 19/416 |
| | | | | 318/571 |
| 2014/0159526 A1* | 6/2014 | Ohbayashi | .......... | F16C 32/0446 |
| | | | | 310/90.5 |
| 2016/0062338 A1* | 3/2016 | Watanabe | ............ | G05B 19/416 |
| | | | | 700/189 |

FOREIGN PATENT DOCUMENTS

| | | |
|---|---|---|
| JP | 06274220 A | 9/1994 |
| JP | 07239708 A | 9/1995 |
| WO | WO 2006/063945 A1 | 6/2006 |

\* cited by examiner

FIG. 1
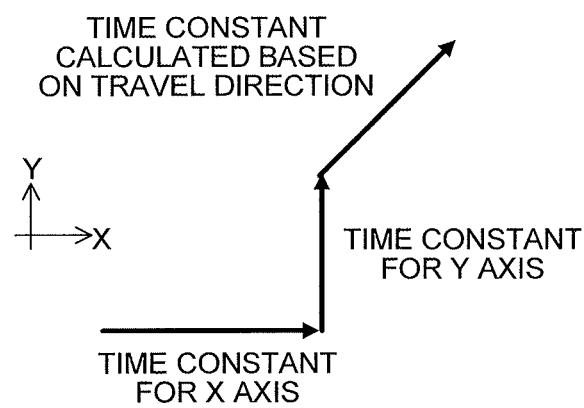
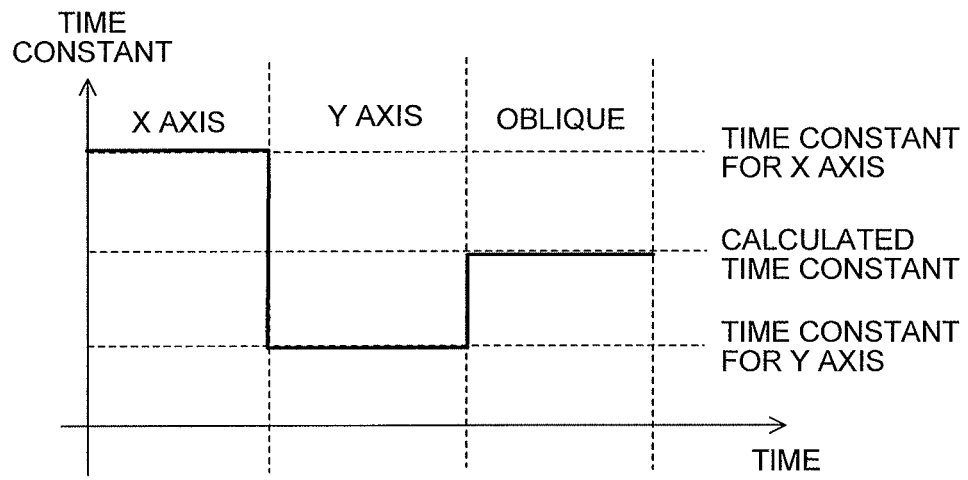

FIG. 2
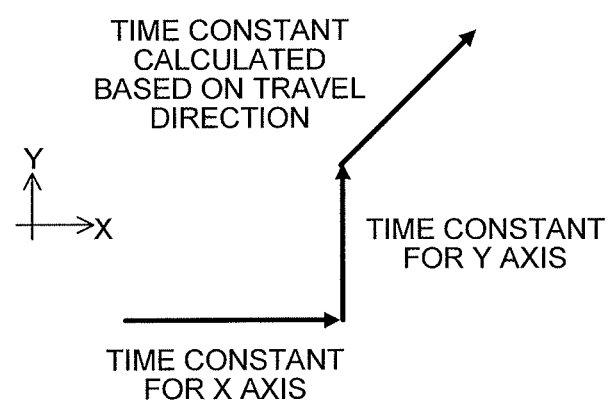
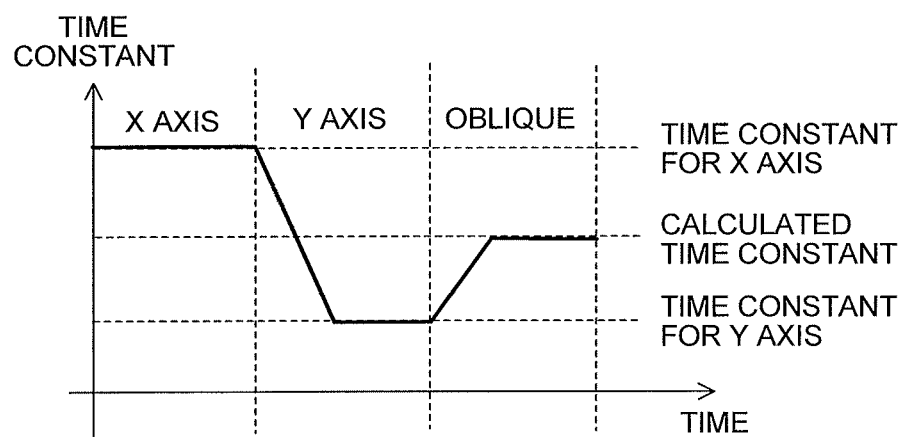

FIG. 3
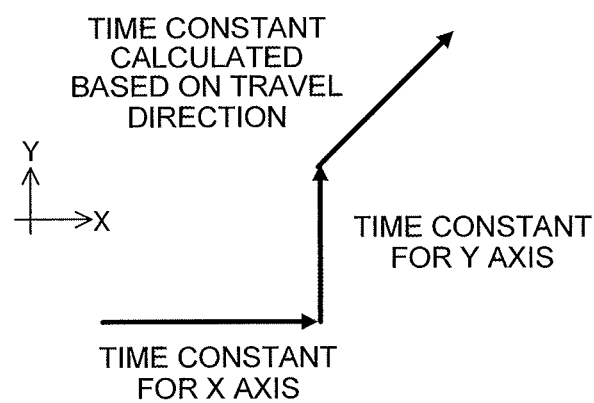
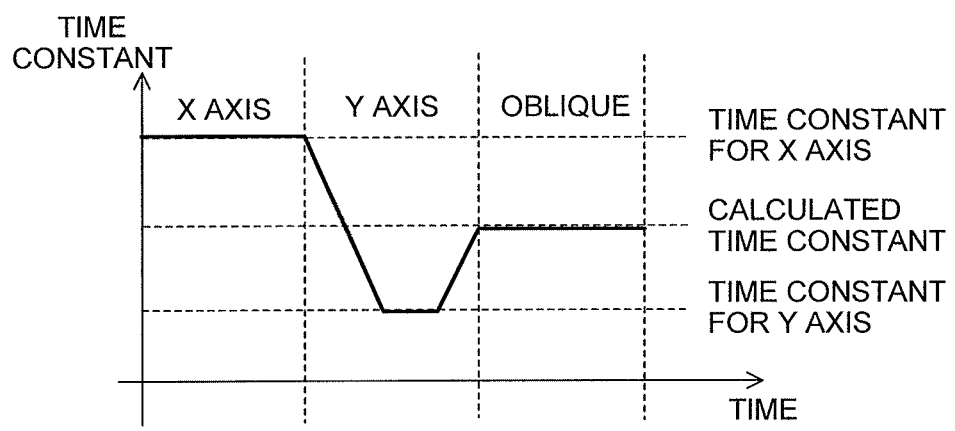

FIG. 16
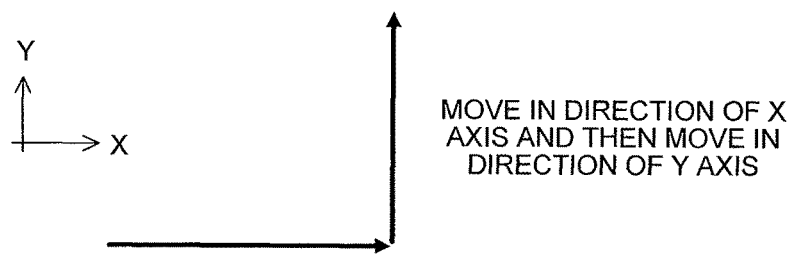
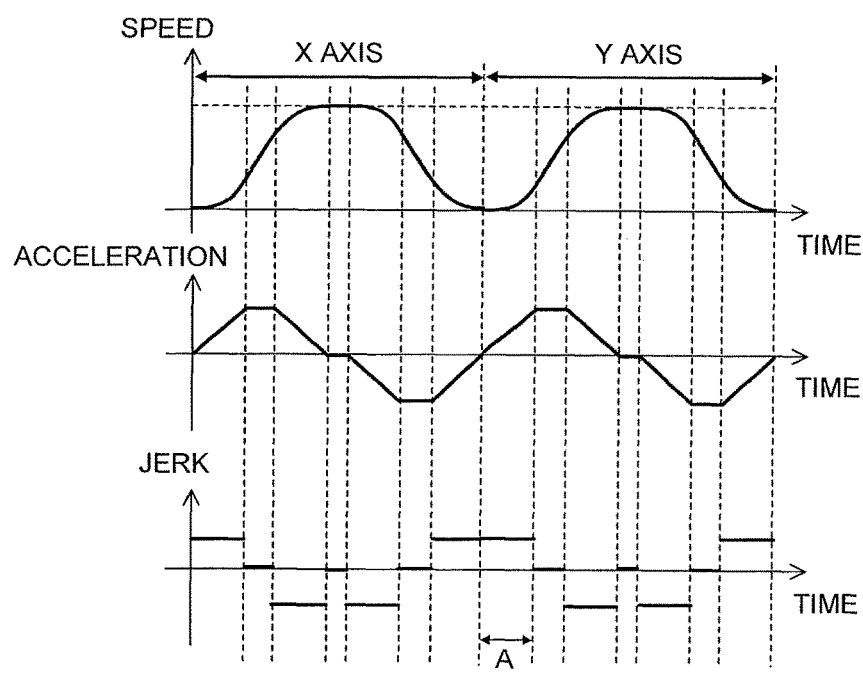

NUMERICAL CONTROLLER DYNAMICALLY SWITCHING TIME CONSTANT FOR ACCELERATION AND DECELERATION FILTER

BACKGROUND OF THE INVENTION

1. Field of the Invention

The present invention relates to a numerical controller, and in particular, to a numerical controller that dynamically switches a time constant for an acceleration and deceleration filter.

2. Description of the Related Art

A linear acceleration and deceleration control system is known as a system that controls acceleration and deceleration of a servo motor. In the linear acceleration and deceleration system (left of FIG. 15), the acceleration changes rapidly, thus disadvantageously shocking a servo control system and a loading system therefor, resulting in the likelihood of vibration. To avoid such a disadvantage, a bell-shaped acceleration and deceleration system (right of FIG. 15) has been used in which a tangential jerk is suppressed by applying a time constant filter to the linear acceleration and deceleration. In the bell-shaped acceleration and deceleration, the acceleration and deceleration have values expressed in Equation (1) as follows.

$$\text{Jerk} = \frac{\text{Acceleration}}{\text{Time Constant}} \quad (1)$$

As indicated by Equation (1), to set a jerk equal to or smaller than a predetermined limit value in the bell-shaped acceleration and deceleration, the time constant needs to have a large value. However, an increased time constant reduces the jerk, while increasing a cycle time. Thus, operators desire to use the minimal time constant required to the extent that machines are prevented from being significantly shocked.

As a related art that controls the speed, acceleration, and jerk on axes provided in a machine during driving, for example, International Publication WO 2006/063945 discloses a technique in which a tangential limit speed, a tangential limit acceleration, and a tangential limit jerk are provided for each section of a path, and speed curves are created which extend in opposite directions from a section with a locally minimum limit speed and are connected together to create a speed curve that meets the limit.

Japanese Patent Application Laid-open No. 06-095720 discloses a technique in which, when a machining program for a numerical controller is executed in which discrete time constants are provided for a plurality of axes, speed control is performed by using, for an operation using only a single axis, the time constant for that axis and using, when a plurality of axes are simultaneously operated, the largest one of the time constants for the axes.

In a driving system operated using a plurality of axes, the ratio between the jerk and the acceleration may vary among the axes due to, for instance, a variation in rigidity among components used for the axes. In such a case, the minimal time constant required varies among the axes used to operate the driving system (the minimal time constant required varies according to a travel direction), but the conventional numerical controller fails to change the time constant during machining and constantly maintains the time constant independently of the axis when a time constant filter is applied.

Thus, when a driving system operated using a plurality of axes are controlled, the maximum value of the time constant needs to be used which results from calculation for all the axes that may be controlled. Thus, a time constant larger than the minimal time constant required may be used according to the travel direction, disadvantageously increasing the cycle time.

For example, as depicted in FIG. 16, in a driving system operated on two axes of an X axis and a Y axis, the same acceleration limit is assumed to be used both for the X axis and for the Y axis, and a jerk limit for the Y axis is assumed to be twice as high as a jerk limit for the X axis. In such a case, the minimal time constant required for traveling in the direction of the X axis has twice as large a value as the minimal time constant required for traveling in the direction of the Y axis. However, since the time constant is inhibited from being changed during operation, the time constant is set to a value (larger value) that meets the acceleration limit and the jerk limit for the X axis. Thus, a sufficient jerk fails to be obtained in the direction of the Y axis, resulting in an increased cycle time.

When the technique disclosed in WO 2006/063945 is applied in order to solve the above-described problem, the jerk needs to be directly controlled so as to have an appropriate value within the range of limitation. In that case, a complicated path through which a control target is moved increases the amount of calculation that needs to be processed per unit time, leading to the need for a high-performance CPU and the like. This poses a problem with costs.

Even when the technique disclosed in Japanese Patent Application Laid-open No. 06-095720 is applied, the technique fails to switch the time constant during operation. This disadvantageously precludes the optimal time constant from being continuously used when the travel direction changes.

SUMMARY OF THE INVENTION

Thus, an object of the present invention is to provide a numerical controller that enables an optimal time constant to be set according to a travel direction of a control target in a machine.

In the numerical controller in the present invention, a time constant is changed according to a travel direction of a control target so as to allow an optimal time constant (a minimal time constant required) to be constantly used.

An aspect of the present invention relates to a numerical controller that controls axes in a machine based on a program to move a control target. The numerical controller includes a command analysis unit that looks ahead and analyzes commands indicated by a block contained in the program to output command data, a time constant calculation unit that identifies a travel direction of the control target for each of the commands based on the command data to calculate a time constant based on the identified travel direction and a set value, using an equation illustrated below, a pre-interpolation acceleration and deceleration unit that performs a linear acceleration and deceleration process on the command data, a time constant setting unit that sets a time constant for filter processing based on the time constant for each of the commands calculated by the time constant calculation unit, a filter processing unit that performs filter processing on the command data subjected to the linear acceleration and deceleration process by the pre-interpolation acceleration and deceleration unit, based on the time constant for filter processing set by the time constant setting unit, and an interpolation unit that calculates movement of each of the axes for each interpolation period based on the command data subjected to the filter processing by the filter processing unit.

$$\text{Minimal time constant required} = \max_{ix} \frac{\text{Acceleration in travel direction} \times \text{Direction cosine } (ix)}{\text{Allowable jerk } (ix)}$$

When a time constant different from a time constant currently set for filter processing is set as a new time constant for filter processing, the time constant setting unit may set a value of the time constant to be gradually changed.

When the value of the time constant gradually changes, if the time constant increases, the time constant setting unit may increase the time constant before a processing target is switched from a command currently processed to a next command to be processed.

A time constant range may be preset within which the time constant is enabled to be changed within one interpolation period when the time constant is gradually changed, and the time constant setting unit dynamically adjusts the time constant range.

Compared to the related art, the aspect of the present invention reduces the time constant, thus shortening a cycle time while preventing a possible shock.

BRIEF DESCRIPTION OF THE DRAWINGS

FIG. 1 is a diagram illustrating a basic (first) method for changing a time constant according to a travel direction of a control target which method is executed by a numerical controller in the present invention;

FIG. 2 is a diagram illustrating a second method for changing the time constant according to the travel direction which method is executed by the numerical controller in the present invention;

FIG. 3 is a diagram illustrating a third method for changing the time constant according to the travel direction which method is executed by the numerical controller in the present invention;

FIG. 16 is a diagram illustrating a problem with setting of the time constant in the related art.

DETAILED DESCRIPTION OF THE PREFERRED EMBODIMENTS

Figure 4:
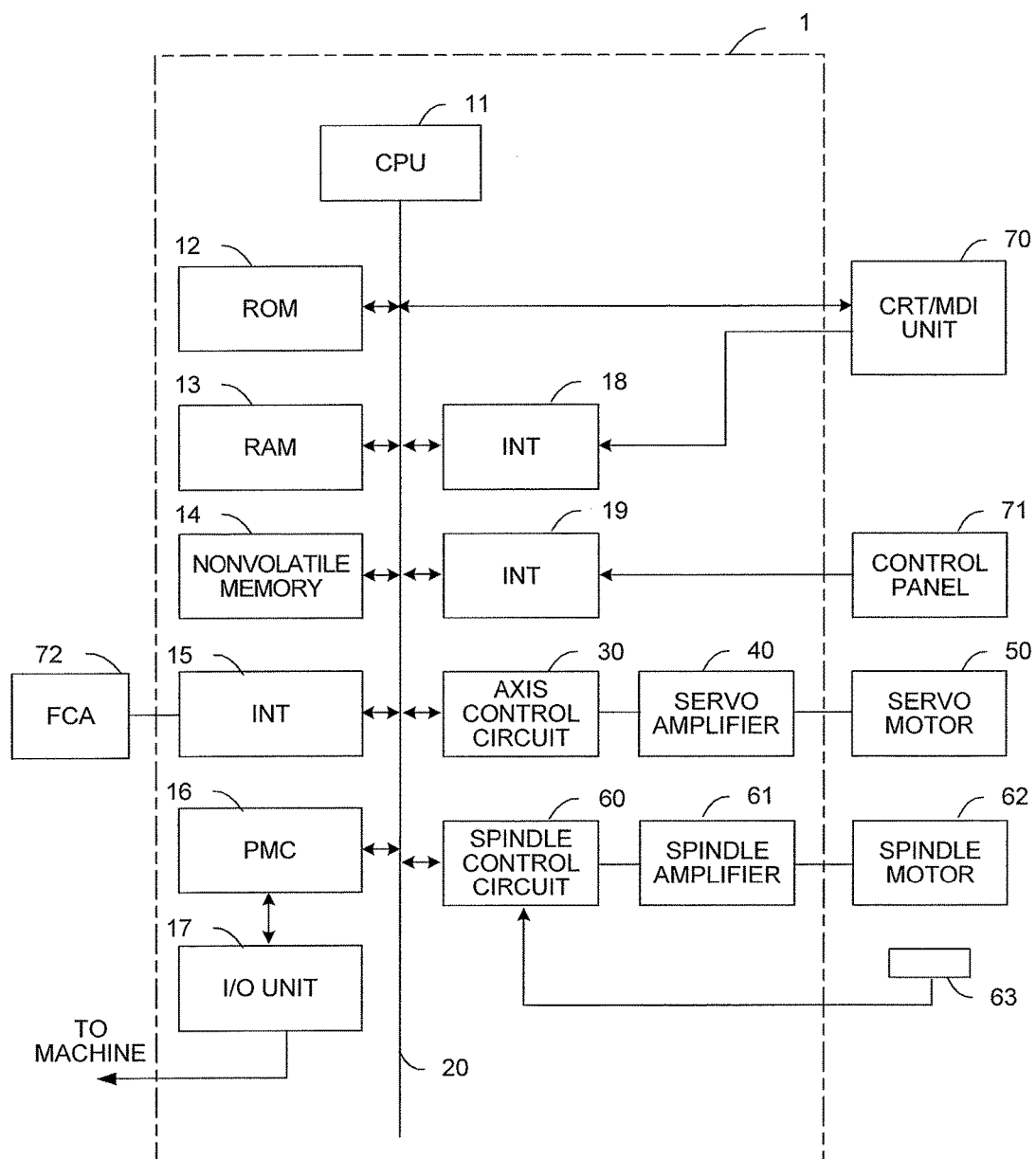
FIG. 4 is a diagram of a hardware configuration illustrating an important part of a numerical controller in an embodiment of the present invention.

FIG. 1 is a diagram illustrating a basic method for changing a time constant according to a travel direction of a control target which method is executed by a numerical controller in the present invention.

When the control target is moved in the direction of each axis, the numerical controller in the present invention uses a minimal time constant required determined based on an acceleration limit and a jerk limit for the axis. When two or more axes are simultaneously moved to move the control target in a direction resulting from synthesis of movements of the two or more axes, the numerical controller uses the minimal time constant required determined in Equation (2) as follows. In Equation (2), an axis is denoted by ix, a numerator on the right side of Equation (2) represents each axial component of the acceleration in the travel direction, and a denominator on the right side of the equation represents an allowable jerk for each axis (jerk limit). In other words, Equation (2) means that, for each axis, the axial component of the acceleration in the travel direction is divided by the allowable jerk for the axis and that the maximum value of the calculated values is determined to be the minimal time constant required.

$$\text{Minimal time constant required} = \max_{ix} \frac{\text{Acceleration in travel direction} \times \text{Direction cosine } (ix)}{\text{Allowable jerk } (ix)} \quad (2)$$

FIG. 2 is a diagram illustrating a second method for changing the time constant according to the travel direction which method is executed by the numerical controller in the present invention.

In general, a rapid variation in time constant causes a shock. Thus, in changing the time constant when the travel direction of the control target changes, the numerical controller in the present invention gradually changes the time constant to prevent a possible shock.

FIG. 3 is a diagram illustrating a third method for changing the time constant according to the travel direction which method is executed by the numerical controller in the present invention.

As described in Description of the Related Art, a shock is caused when, for each axis, a time constant smaller than the minimal time constant required is used. Thus, in gradually increasing the time constant, the numerical controller in the present invention fully increases the time constant before the travel direction changes in order to prevent the use of a time constant smaller than the minimal time constant required for each axis.

In the numerical controller in the present invention, when the time constant is gradually changed, a time constant range may be preset within which the time constant can be changed within one interpolation period, and the time constant range within which the time constant can be changed within one interpolation period may be dynamically changed based on occurrences of a shock during past machining.

A configuration of the numerical controller in the present invention will be described below.

FIG. 4 is a diagram of a hardware configuration illustrating important parts of a numerical controller in an embodiment of the present invention and a machine tool controllably driven by the numerical controller.

A CPU 11 provided in a numerical controller 1 is a processor that generally controls the numerical controller 1. The CPU 11 reads a system program stored in a ROM 12 via a bus 20, and controls the whole numerical controller 1 in accordance with the system program. The RAM 13 stores temporary calculation data, display data, various data input by an operator via a CRT/MDI unit 70, and the like.

A nonvolatile memory 14 is configured as a memory that is, for example, backed up by a battery not depicted in the drawings to maintain a storage state even when the numerical controller 1 is powered off. The nonvolatile memory 14 stores a machining program described below and loaded via an interface 15 and a machining program input via the CRT/MDI unit 70. The nonvolatile memory 14 further stores a machining program operation processing program used to operate the machining program, an axis control processing program, and the like. These programs are expanded into a RAM 13 during execution. To the ROM 12, various system programs are pre-written which are used to execute processing for an edition mode needed to create and edit the machining program. Various machining programs such as the machining program used to execute the present invention can be input via the interface 15 or the CRT/MDI unit 70 and stored in the nonvolatile memory 14.

The interface 15 is configured to connect the numerical controller 1 to external equipment 72 such as an adapter. Machining programs, various parameters, and the like are loaded from the external equipment 72. Machining programs edited in the numerical controller 1 can be stored in an external storage means via the external equipment 72. A programmable machine controller (PMC) 16 outputs signals to a peripheral apparatus of the machine tool (for example, an actuator such as a robot hand for tool change) via an I/O unit 17 in accordance with a sequence program embedded in the numerical controller 1. The programmable machine controller, also receives signals via various switches and the like on a control panel provided on the main body of the machine tool, executes needed signal processing on the signals, and passes the processed signals to the CPU 11.

The CRT/MDI unit 70 is a manual data input apparatus having a display, a keyboard and the like, and an interface 18 receives commands and data from a keyboard of the CRT/MDI unit 70 and passes the commands and data to the CPU 11. The interface 19 is connected to a control panel 71 including a manual pulse generator.

An axis control circuit 30 configured to control axes provided in the machine tool receives movement command values for the axes from the CPU 11 and outputs commands for the axes to a servo amplifier 40. Upon receiving the command, the servo amplifier 40 drives a servo motor 50 that moves an axis provided in the machine tool. The servo motor 50 for the axis has a built-in position and speed detector to perform feedback control for position and speed by feeding position and speed feedback signals from the position and speed detector back to the axis control circuit 30. The diagram of the hardware configuration in FIG. 4 depicts only one axis control circuit 30, one servo amplifier 40, and one servo motor 50. However, in actuality, each of the numbers of the axis control circuits 30, the servo amplifiers 40, and the servo motors 50 prepared is the same as the number of the axes provided in the machine tool. In FIG. 4, feedback of positions and speeds from the servo motors 50 is omitted.

A spindle control circuit 60 receives a main-spindle rotation command for the machine tool to output a spindle speed signal to a spindle amplifier 61. Upon receiving the spindle speed signal, the spindle amplifier 61 rotates a spindle motor 62 in the machine tool at a commanded rotation speed to drive a tool.

A position coder 63 is coupled to the spindle motor 62 via a gear, a belt, or the like to output a feedback pulse in synchronism with rotation of a main spindle. The feedback pulse is read by the CPU 11.

Figure 5:
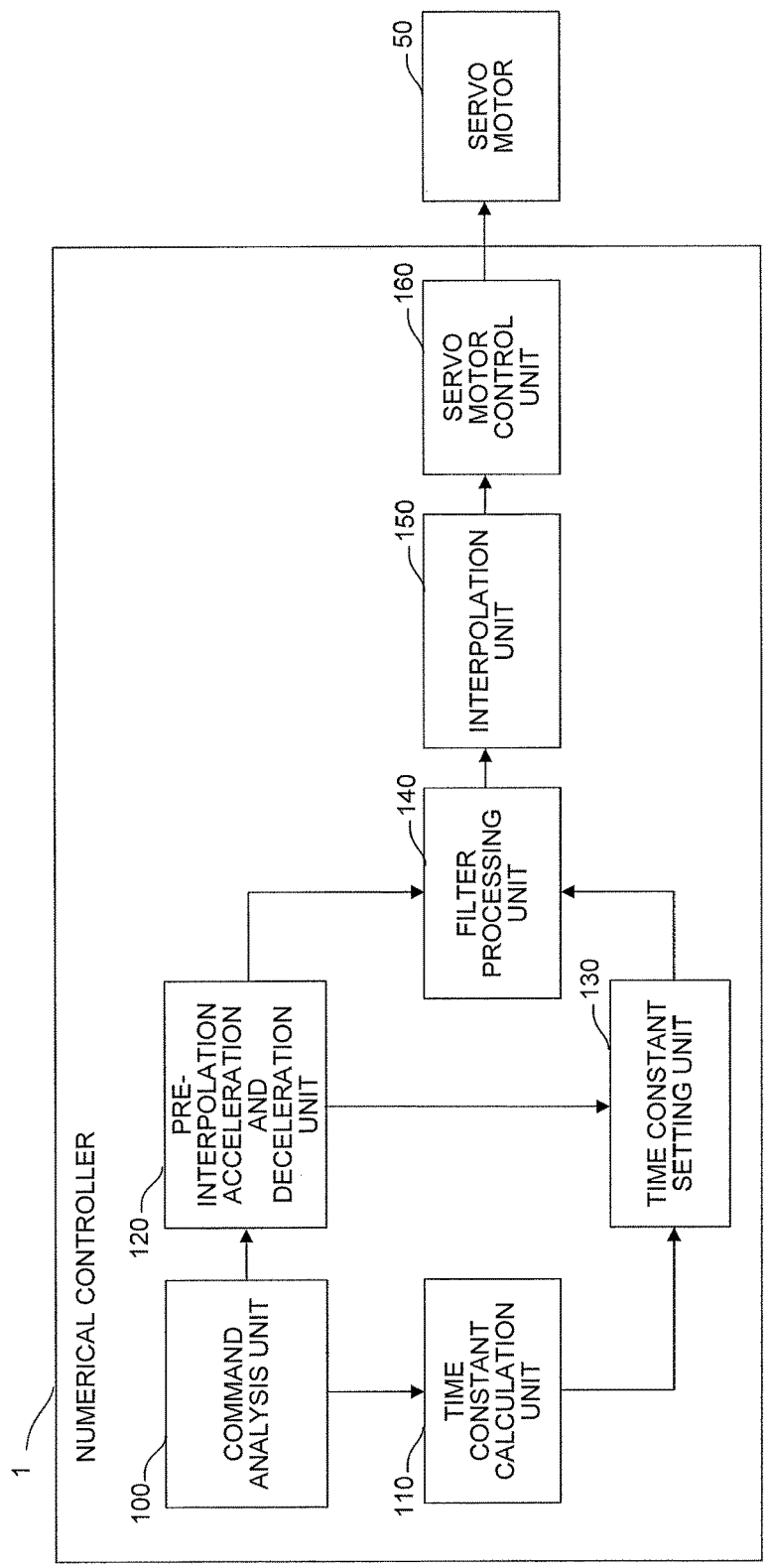
FIG. 5 is a schematic functional block diagram of the numerical controller in the embodiment of the present invention.

FIG. 5 is a schematic functional block diagram illustrating that the numerical controller 1 shown in FIG. 4 is provided, through a system program, with a function to change the time constant according to the travel direction of the control target which function is provided in the present invention.

Functional means illustrated in FIG. 5 are implemented by the CPU 11 depicted in FIG. 4, by executing the system program to provide the functions. The numerical controller 1 according to the present embodiment includes a command analysis unit 100, a time constant calculation unit 110, a pre-interpolation acceleration and deceleration unit 120, a time constant setting unit 130, a filter processing unit 140, an interpolation unit 150, and a servo motor control unit 160.

The command analysis unit 100 looks ahead and analyzes a block that is contained in a program or the like stored in a memory not depicted in the drawings and that indicates an operation of a machine corresponding to a control target, generates command data indicating movement of the control target using the servo motors 50, based on the results of the analysis, and outputs the created command data to the time constant calculation unit 110 and the pre-interpolation acceleration and deceleration unit 120. For the command data created by the command analysis unit 100, one command data may be created for each command indicated by the block looked ahead from the program or a travel path indicated by the block looked ahead from the program may be divided into micro line segments so that one command data can be created for the path of each micro line segment resulting from the division. No problem is posed so long as the travel directions of the control target indicated by the respective command data are the same.

The time constant calculation unit 110 identifies the travel direction of the control target indicated by the command data output from the command analysis unit 100, calculate the optimal time constant (minimal time constant required) using Equation (2) based on the identified travel direction and set values for each axis (a speed limit, an acceleration limit, a jerk limit, and the like) and outputs the calculated time constant (hereinafter referred to as the calculated optimal time constant) for each command data to the time constant setting unit 130.

The pre-interpolation acceleration and deceleration unit 120 executes a pre-interpolation linear acceleration and deceleration process on the command data output from the command analysis unit 100, and outputs the command data subjected to the pre-interpolation linear acceleration and deceleration process to the time constant setting unit 130 and the filter processing unit 140.

The time constant setting unit 130 determines, on the basis of an optimal time constant for each command date output from the time constant calculation unit 110, a time constant for the current interpolation period (the interpolation period when processing is in execution), and sets the determined time constant in the filter processing unit 140 as a time constant for filter processing. The time constant setting unit 130 may simply set the optimal time constant for the command data processed during each interpolation period, in the filter processing unit 140 as a time constant for the current interpolation period, or so as to gradually change the time constant during consecutive different command data, determine time constants for the consecutive interpolation periods based on the optimal time constants for the corresponding consecutive command data and set the determined time constants in the filter processing unit 140. To gradually change the time constant before the command data changes, the time needed for the change in time constant is estimated, and the interpolation period when the change in time constant is started is calculated. For estimation of the time needed for the change in time constant, information needed to determine the interpolation period and the like when the time constant is changed is acquired from the command data subjected to the pre-interpolation linear acceleration and deceleration process which data has been output from the pre-interpolation acceleration and deceleration unit 120.

The filter processing unit 140 uses the time constant for filter processing set by the time constant setting unit 130 to execute filter processing on the command data subjected to the pre-interpolation linear acceleration and deceleration process which data has been output from the pre-interpolation acceleration and deceleration unit 120, and outputs the filtered command data to the servo motor control unit 160.

The interpolation unit 150 generates interpolation data including points for the respective axes for each interpolation period with respect to the filtered command data output from the filter processing unit 140, and outputs the generated interpolation data to the servo motor control unit 160 controlling each servo motor 50.

The servo motor control unit 160 controls the servo motors 50 that drive the axes of the machine which are control targets, based on the interpolation data for each axis output from the interpolation unit 150.

An example of filter processing based on a changed time constant and performed by the numerical controller 1 configured as described above will be described with reference to FIGS. 6 to 11. FIGS. 6 to 11 are diagrams illustrating speed pulses obtained when the numerical controller 1 in the present embodiment changes the time constant and including a speed pulse (input pulse) obtained before a filter is applied and output arrays in which speed pulses (output pulses) obtained after the filter is applied are arranged. The speed pulses in FIGS. 6 to 11 represent an amount of movement in the travel direction at each interpolation period. For each interpolation period, the time constant for the corresponding point in time is set by the time constant setting unit 130. In FIGS. 6 to 11, the time constant is represented as a numerical value for each interpolation period for simplification of description.

Figure 6:
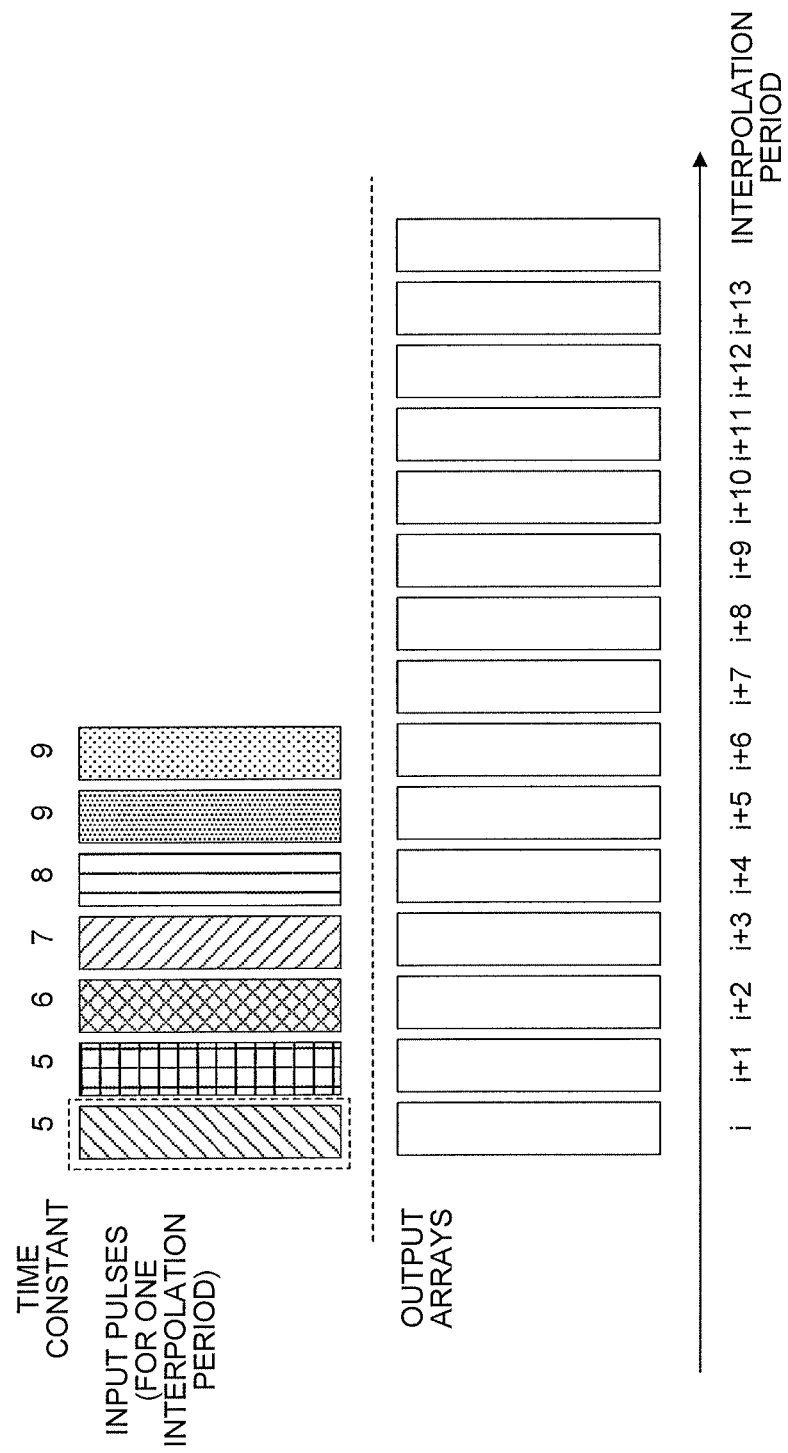
FIG. 6 is a diagram (1) illustrating a speed pulse obtained before and after a filter is applied when the numerical controller in the embodiment of the present invention changes the time constant.

FIG. 6 illustrates a state when filter processing is started with interpolation period i.

Figure 7:
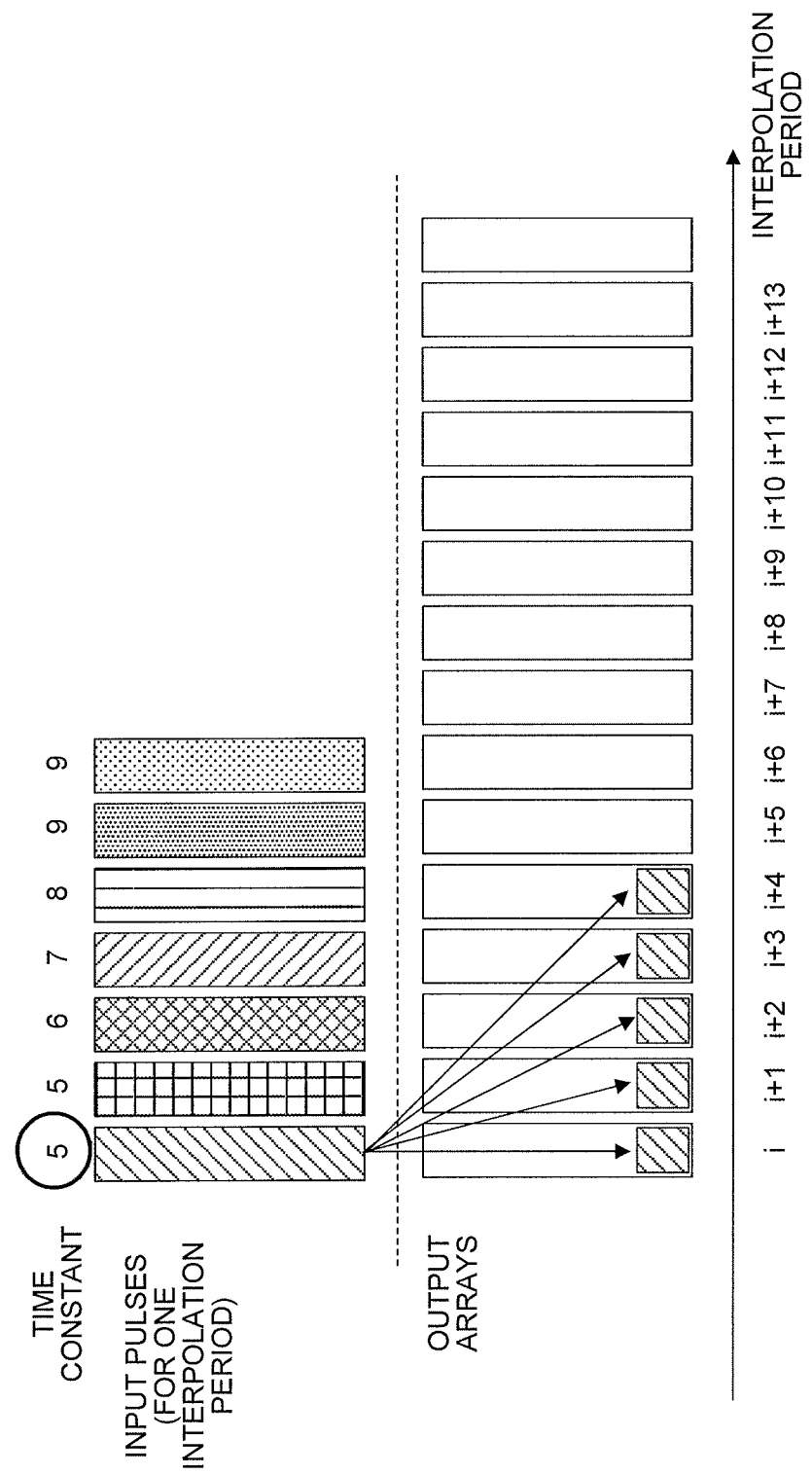
FIG. 7 is a diagram (2) illustrating a speed pulse obtained before and after a filter is applied when the numerical controller in the embodiment of the present invention changes the time constant.

If the time constant setting unit 130 sets the time constant to 5 at the interpolation period i as depicted in FIG. 6, the filter processing unit 140 divides the input pulse at the interpolation period i into equal pieces according to the time constant (that is, 5 at the interpolation period i) and accumulates (integrates) the resultant pieces in output arrays corresponding to the interpolation period i to an interpolation period (i+4) as depicted in FIG. 7.

Figure 8:
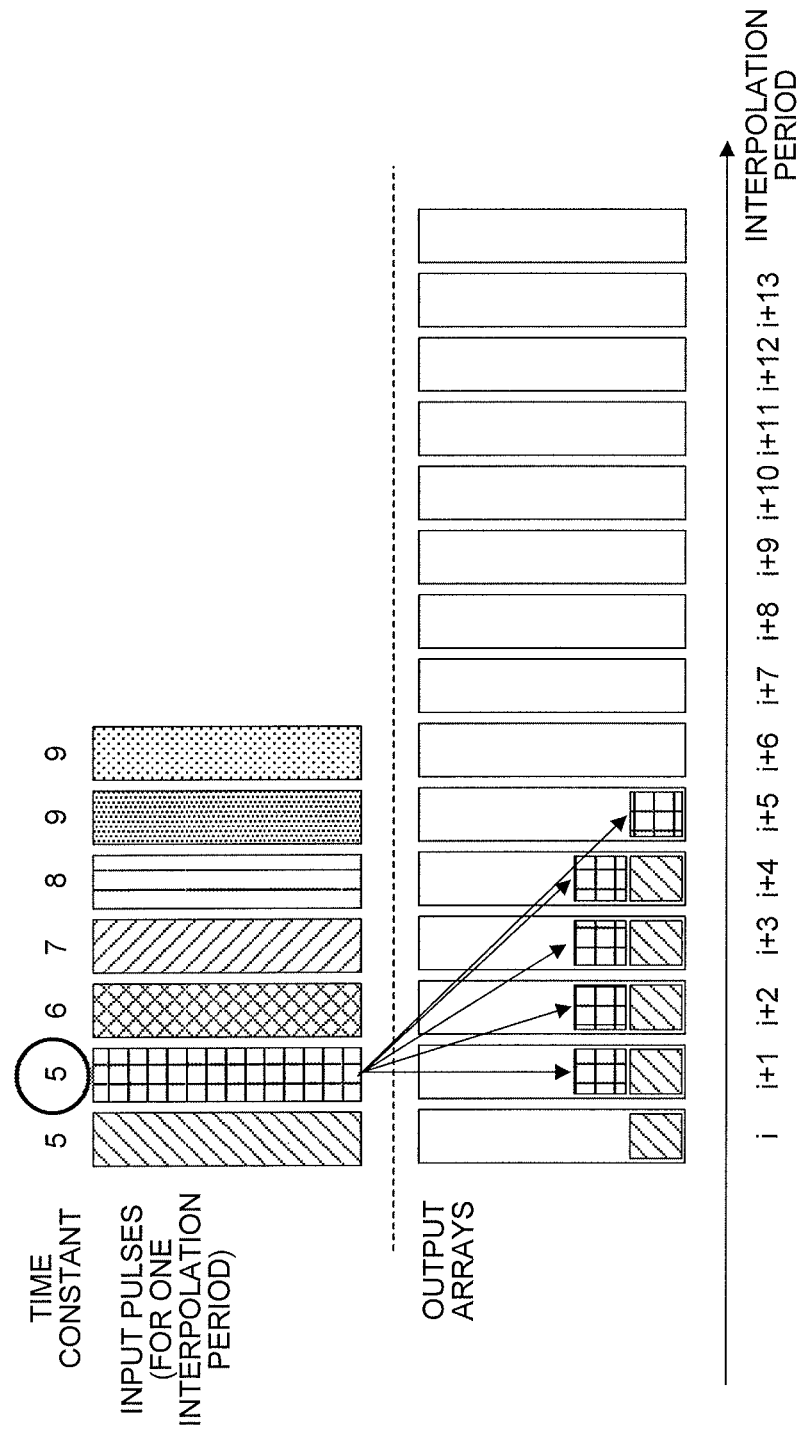
FIG. 8 is a diagram (3) illustrating a speed pulse obtained before and after a filter is applied when the numerical controller in the embodiment of the present invention changes the time constant.

If the time constant setting unit 130 sets the time constant to 5 at an interpolation period (i+1), the filter processing unit 140 divides the input pulse at the interpolation period i into equal pieces according to the time constant (that is, 5 at the interpolation period (i+1)) and accumulates (integrates) the resultant pieces in output arrays corresponding to the interpolation period (i+1) to an interpolation period (i+5) as depicted in FIG. 8.

Figure 9:
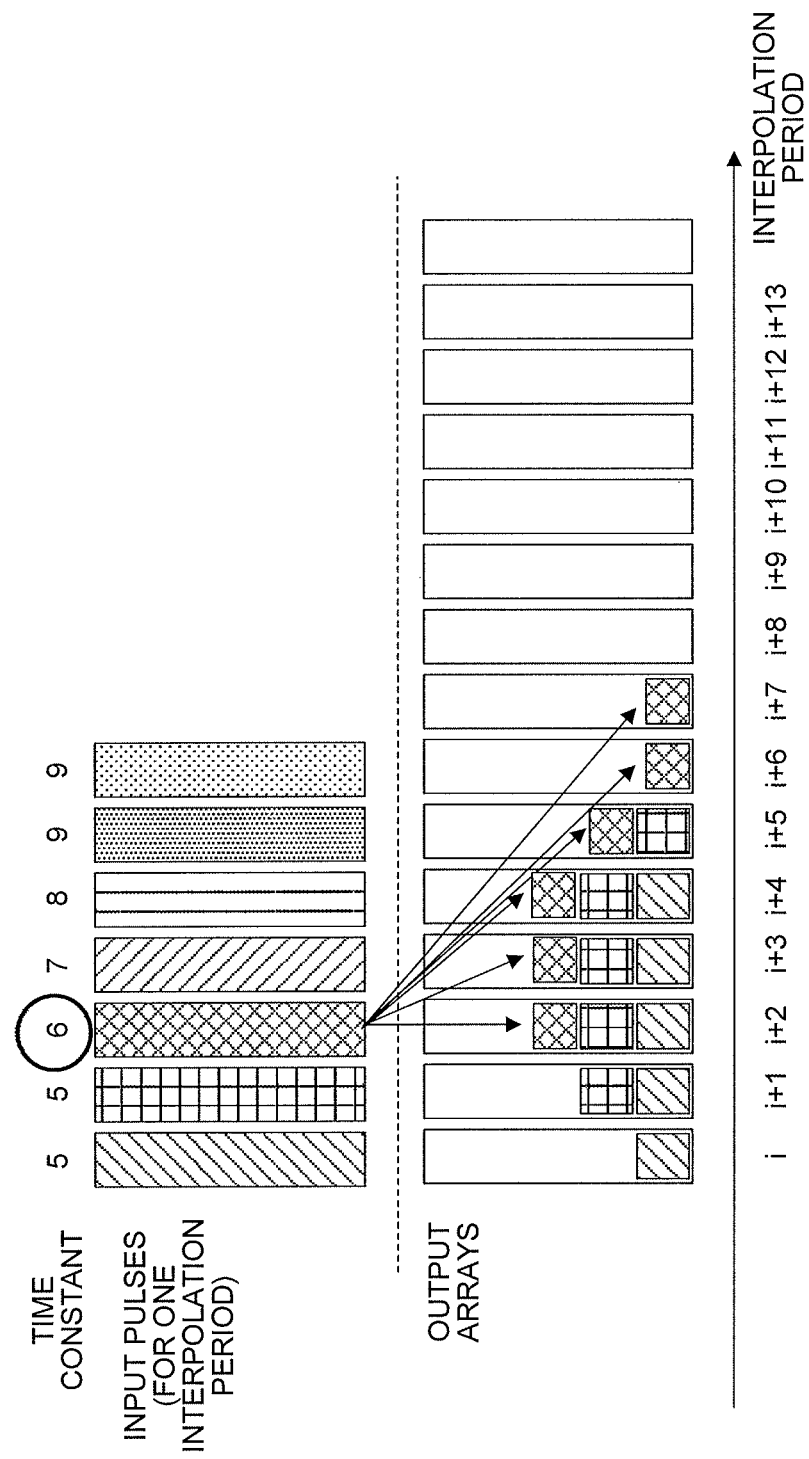
FIG. 9 is a diagram (4) illustrating a speed pulse obtained before and after a filter is applied when the numerical controller in the embodiment of the present invention changes the time constant.
Figure 10:
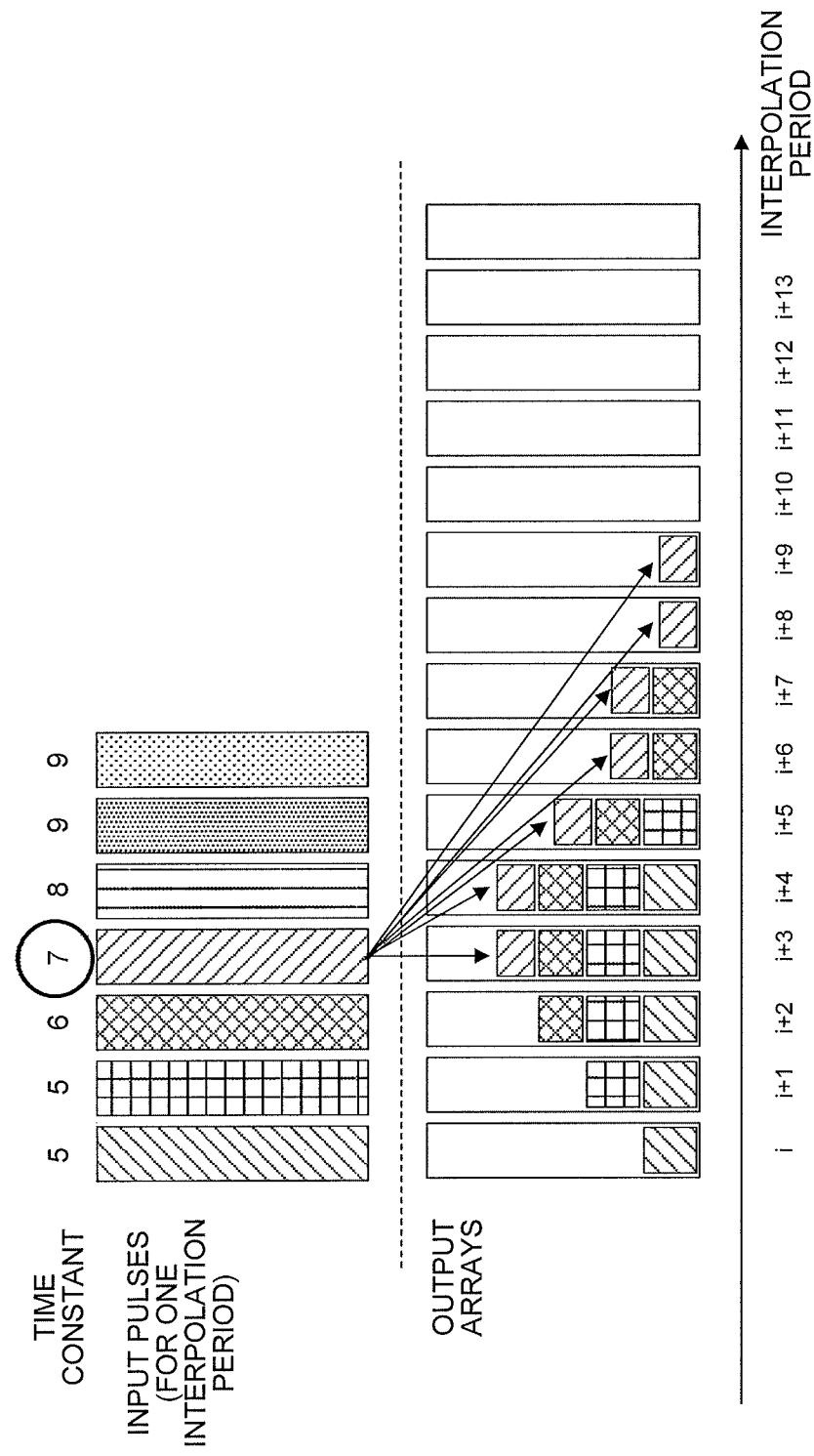
FIG. 10 is a diagram (5) illustrating a speed pulse obtained before and after a filter is applied when the numerical controller in the embodiment of the present invention changes the time constant.

If the time constant setting unit 130 sets the time constant to 6 at an interpolation period (i+2), the filter processing unit 140 divides the input pulse at the interpolation period i into equal pieces according to the time constant (that is, 6 at the interpolation period (i+2)) and accumulates (integrates) the resultant pieces in output arrays corresponding to the interpolation period (i+2) to an interpolation period (i+7) as depicted in FIG. 9. Similar processing is performed for an interpolation period (i+3) (FIG. 10).

Figure 11:
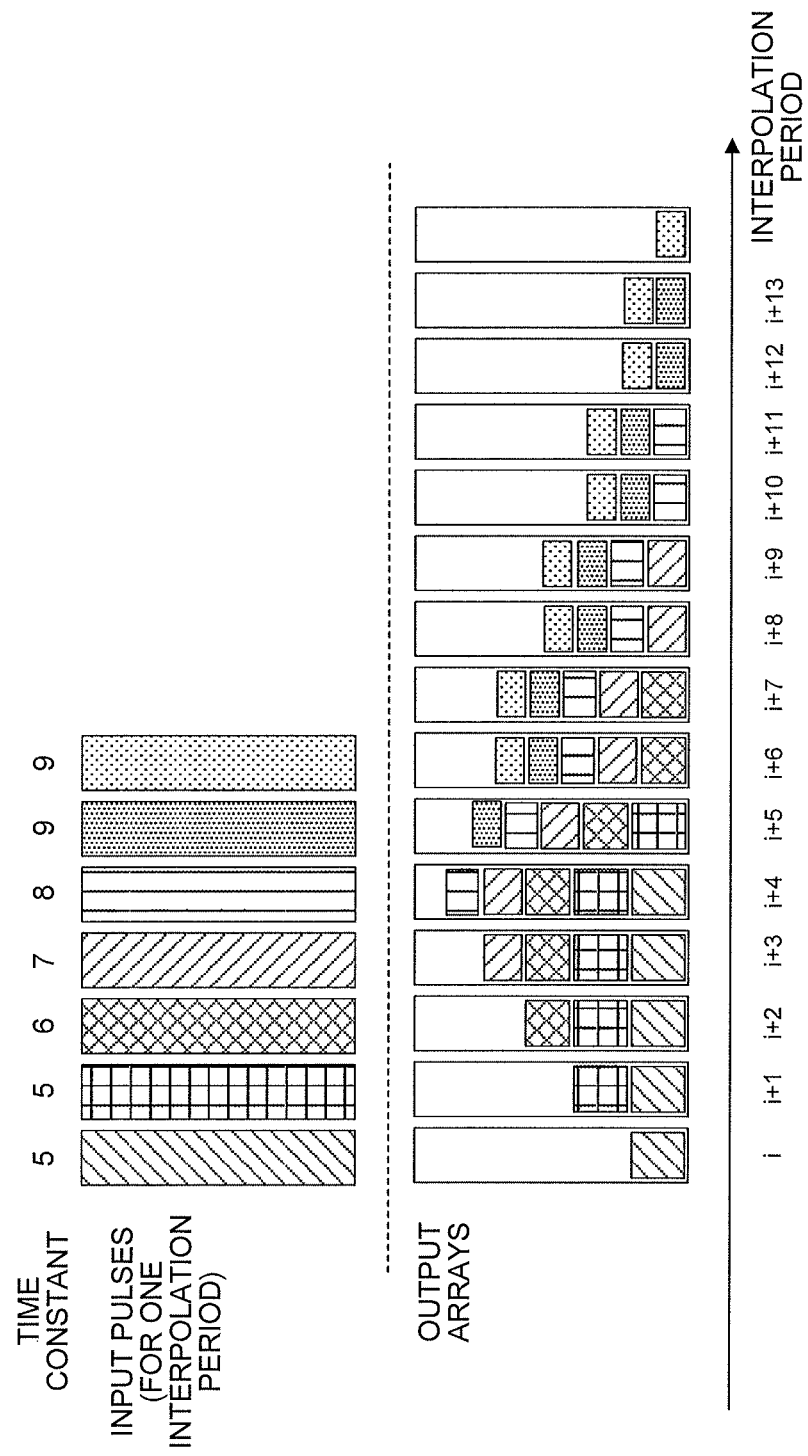
FIG. 11 is a diagram (6) illustrating a speed pulse obtained before and after a filter is applied when the numerical controller in the embodiment of the present invention changes the time constant.

Subsequently, similar processing is repeated to set, in the output arrays, the output pulses resulting from application of the filter to the input pulse as depicted in FIG. 11. The output pulses accumulated in each output array are output to the interpolation unit 150, which generates interpolation data for each axis.

Figure 12:
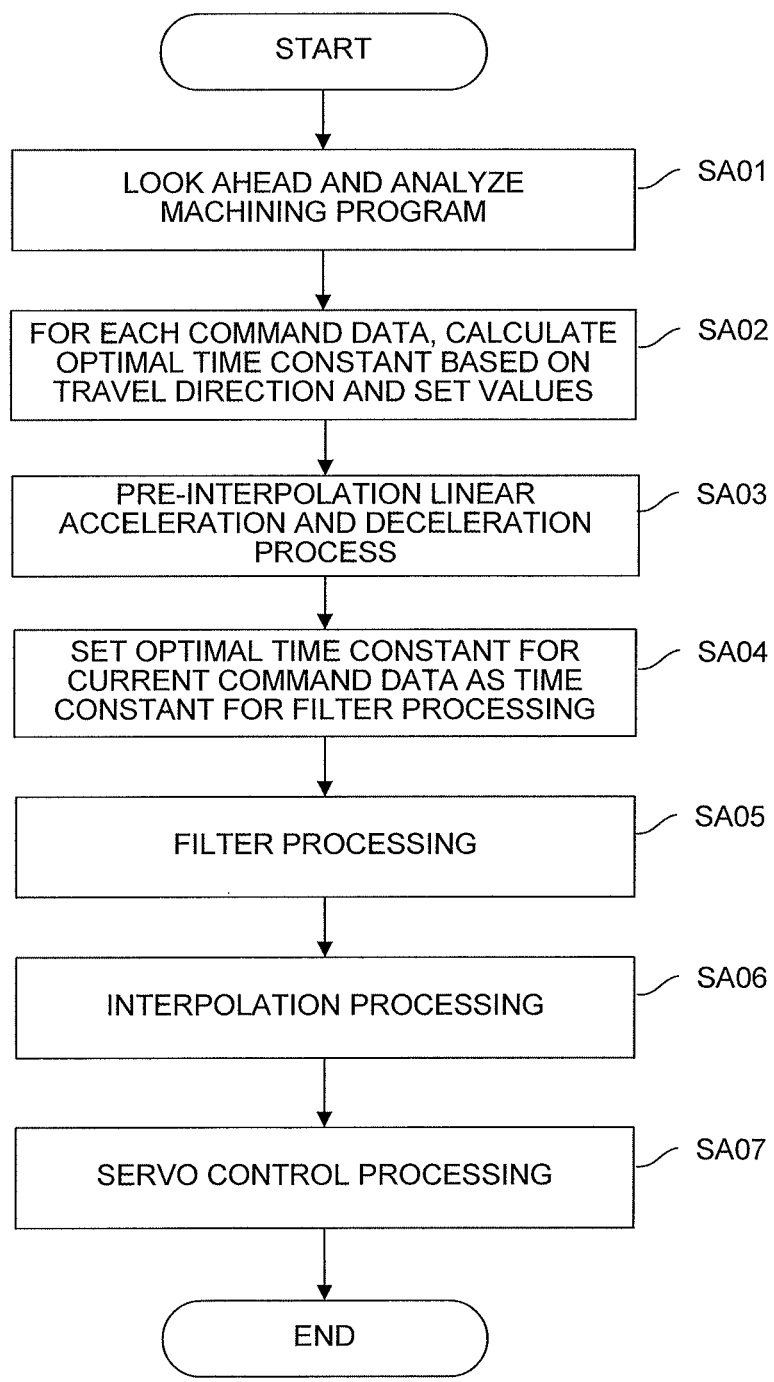
FIG. 12 is a flowchart illustrating a schematic sequence of processing performed by the numerical controller in the embodiment of the present invention in connection with the basic method for changing the time constant according to the travel direction of the control target as described in FIG. 1.

FIG. 12 is a flowchart illustrating a schematic sequence of processing performed by the numerical controller 1 illustrated in FIG. 5 in connection with a basic method for changing the time constant according to the travel direction of the control target as described in FIG. 1. The processing in the flowchart illustrated in FIG. 12 is performed for each control period.

[Step SA01] The command analysis unit 100 looks ahead, from the machining program, a block indicating an operation of the machine corresponding to the control target and analyzes the block, and based on the results of the analysis, generates command data indicating movement of the control target using the servo motors 50.

[Step SA02] The time constant calculation unit 110 identifies the travel direction of the control target indicated by the command data created in step SA01, and calculates the optimal time constant using Equation (2) described above based on the identified travel direction and the set values for each axis (the speed limit, the acceleration limit, the jerk limit, and the like).

[Step SA03] The pre-interpolation acceleration and deceleration unit 120 executes a pre-interpolation linear acceleration and deceleration process on the command data created in step SA01 to generate the command data subjected to the pre-interpolation linear acceleration and deceleration process.

[Step SA04] The time constant setting unit 130 identifies the optimal time constant for the current interpolation period (the interpolation period when the processing is in execution) based on the optimal time constant for each command data calculated in step SA02, and sets the identified optimal time constant in the filter processing unit 140 as a time constant for filter processing.

[Step SA05] The filter processing unit 140 uses the time constant for filter processing set in step SA04 to execute filter processing on the command data subjected to the pre-interpolation linear acceleration and deceleration process which data has been generated in step SA03, to generate the filtered command data.

[Step SA06] The interpolation unit 150 generates interpolation data including points for the respective axes for each interpolation period with respect to the command data filtered in step SA05:

[Step SA07] The servomotor control unit 160 controls the servomotors 50 that drive the axes of the machine corresponding to the control target based on the interpolation data for each axis generated in step SA06.

Figure 13:
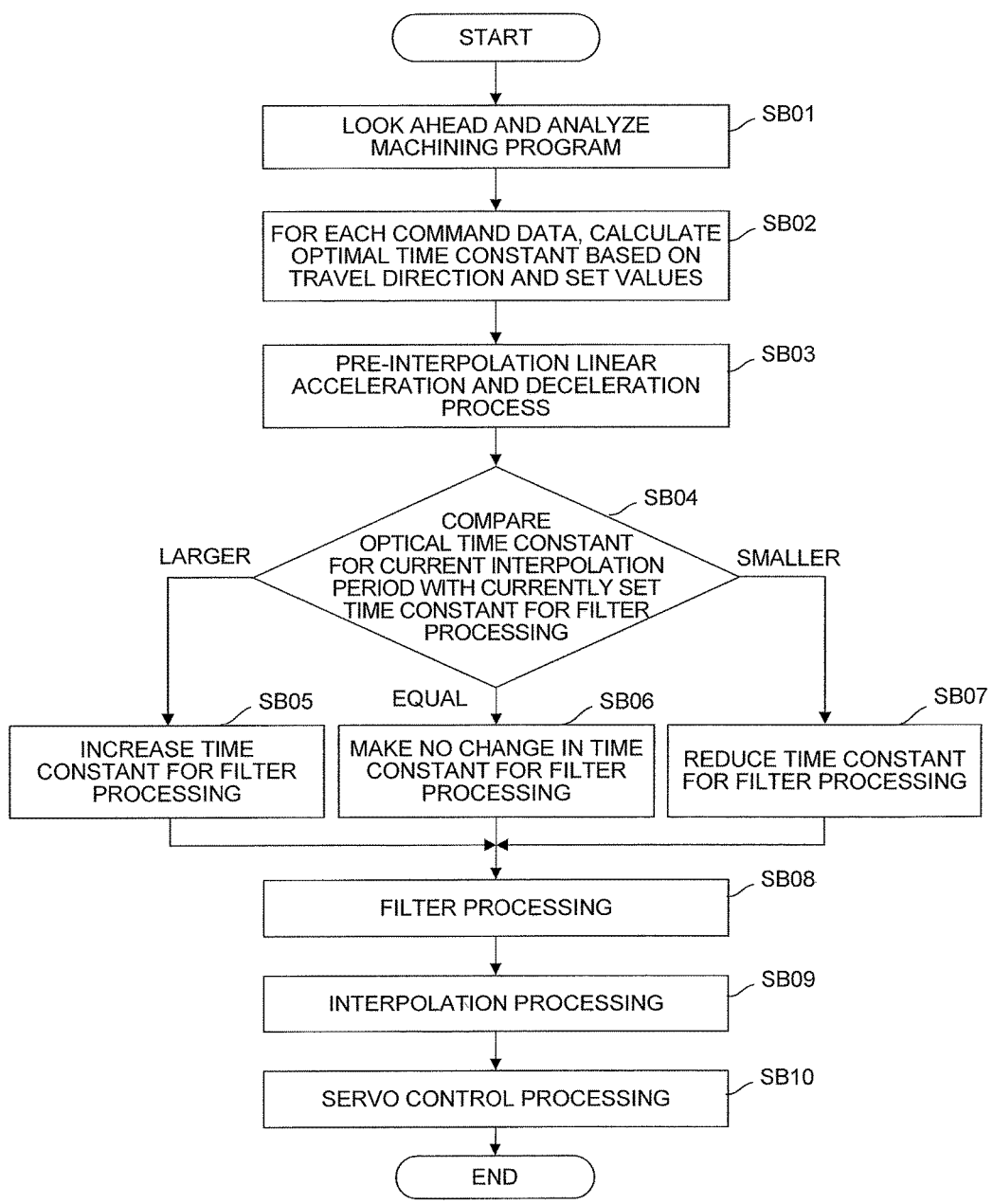
FIG. 13 is a flowchart illustrating a schematic sequence of processing performed by the numerical controller in the embodiment of the present invention in connection with the second method for changing the time constant according to the travel direction of the control target as described in FIG. 2.

FIG. 13 is a flowchart illustrating a schematic sequence of processing performed by the numerical controller 1 illustrated in FIG. 5 in connection with a second method for changing the time constant according to the travel direction of the control target as described in FIG. 2. Processing in the flowchart illustrated in FIG. 13 is performed for each control period.

[Step SB01] The command analysis unit 100 looks ahead, from the machining program, a block indicating an operation of the machine corresponding to the control target and analyzes the block, and based on the results of the analysis, generates command data indicating movement of the control target using the servo motors 50.

[Step SB02] The time constant calculation unit 110 identifies the travel direction of the control target indicated by the command data created in step SB01, and calculates the optimal time constant using Equation (2) described above based on the identified travel direction and the set values for each axis (the speed limit, the acceleration limit, the jerk limit, and the like).

[Step SB03] The pre-interpolation acceleration and deceleration unit 120 executes a pre-interpolation linear acceleration and deceleration process on the command data created in step SB01 to generate the command data subjected to the pre-interpolation linear acceleration and deceleration process.

[Step S304] The time constant setting unit 130 identifies the optimal time constant for the current interpolation period (the interpolation period when the processing is in execution) based on the optimal time constant for each command data calculated in step SB02, and compares the identified optimal time constant for the current interpolation period with the time constant for filter processing currently set in the filter processing unit 140. If the result of the comparison indicates that the optimal time constant for the current interpolation period is larger, the processing proceeds to step SB05. If the result of the comparison indicates that the optimal time constant for the current interpolation period is equal to the identified optimal time constant, the processing proceeds to step SB06. If the result of the comparison indicates that the optimal time constant for the current interpolation period is smaller, the processing proceeds to step SB07.

[Step SB05] The time constant setting unit 130 increases the time constant for filter processing currently set in the filter processing unit 140 within a time constant range which is changeable within one interpolation period, set in advance with the optimal time constant for the current interpolation period set as an upper limit, and then the processing proceeds to step SB08.

[Step SB06] The time constant setting unit 130 shifts the processing to step SB08 without any change in the time constant for filter processing currently set in the filter processing unit 140.

[Step SB07] The time constant setting unit 130 reduces the time constant for filter processing currently set in the filter processing unit 140 within a time constant range which is changeable within one interpolation period, set in advance with the optimal time constant for the current interpolation period set as a lower limit, and then the processing proceeds to step SB08.

[Step SB08] The filter processing unit 140 uses the time constant for filter processing set in steps SB05 to SB07 to execute filter processing on the command data subjected to the pre-interpolation linear acceleration and deceleration process which data has been generated in step SB03, to generate the filtered command data.

[Step SB09] The interpolation unit 150 generates interpolation data including points for the respective axes for each interpolation period with respect to the command data filtered in step SB08.

[Step SB10] The servo motor control unit 160 controls the servo motors 50 that drive the axes of the machine corresponding to the control target based on the interpolation data for each axis generated in step SB09.

Figure 14:
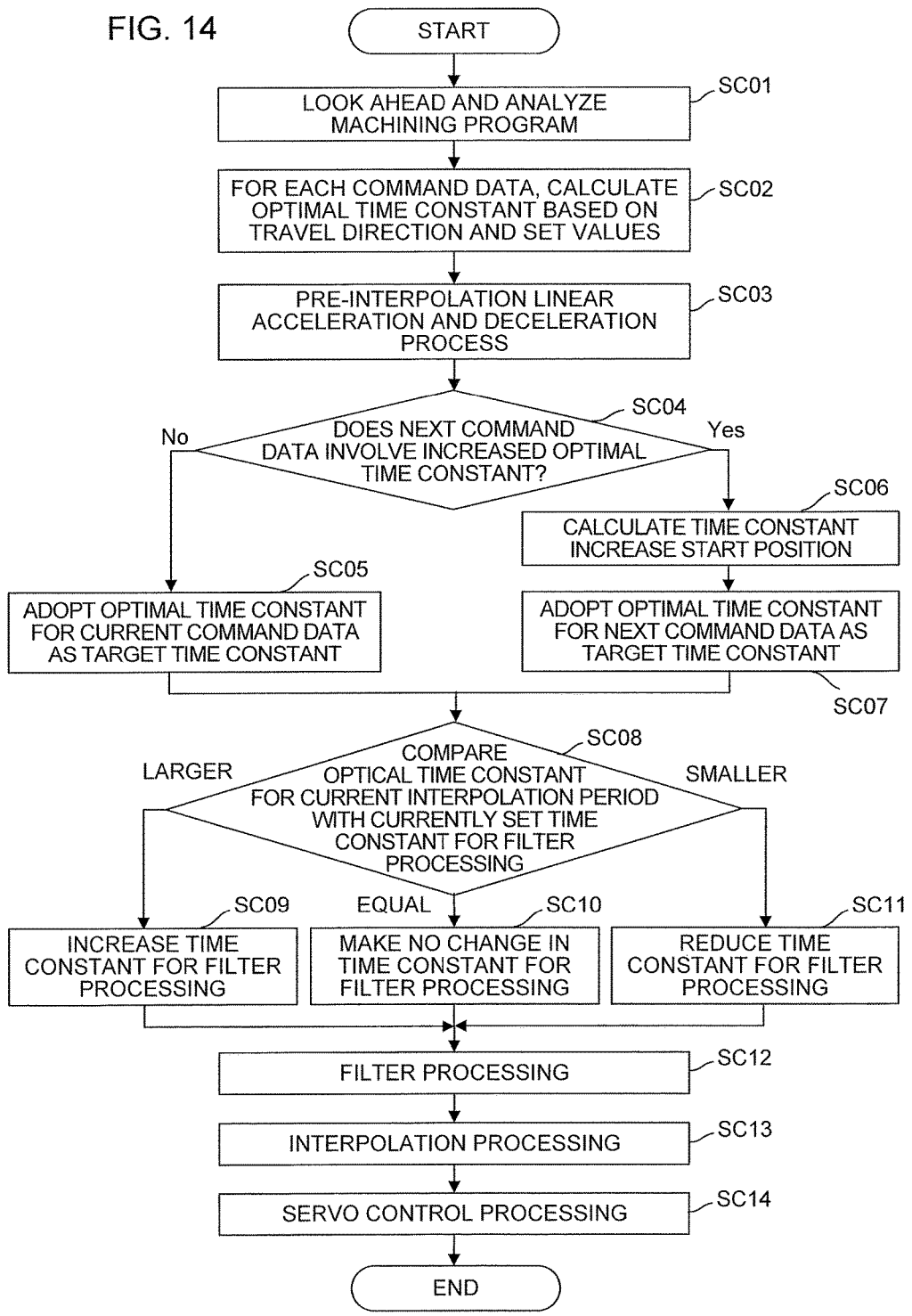
FIG. 14 is a flowchart illustrating a schematic sequence of processing performed by the numerical controller in the embodiment of the present invention in connection with the third method for changing the time constant according to the travel direction of the control target as described in FIG. 3.
Figure 15:
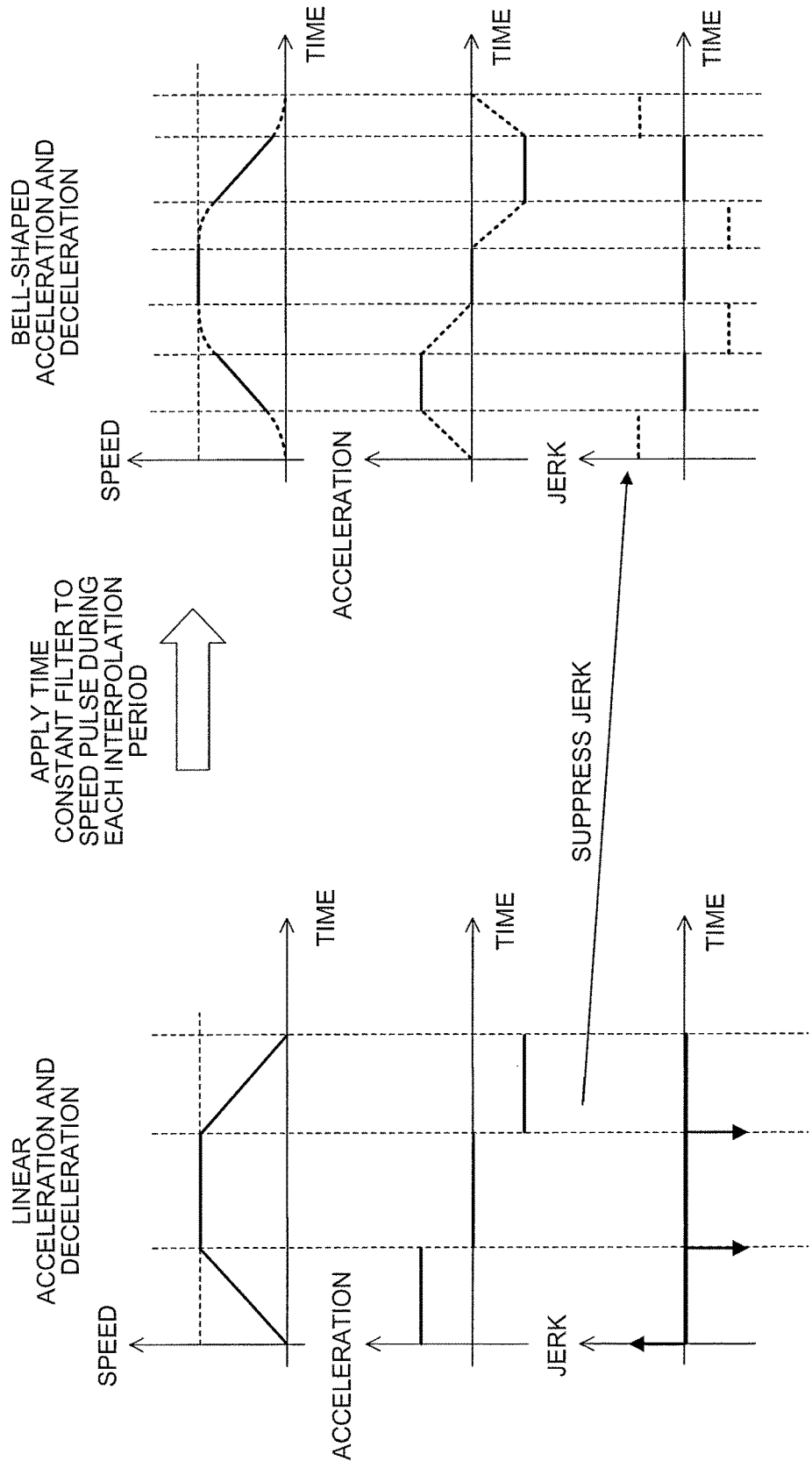
FIG. 15 is a diagram illustrating linear acceleration and deceleration and bell-shaped acceleration and deceleration.

FIG. 14 is a flowchart illustrating a schematic sequence of processing performed by the numerical controller 1 illustrated in FIG. 5 in connection with a third method for changing the time constant according to the travel direction of the control target as described in FIG. 3. Processing in the flowchart illustrated in FIG. 14 is performed for each control period.

[Step SC01] The command analysis unit 100 looks ahead, from the machining program, a block indicating an operation of the machine corresponding to the control target and analyzes the block, and based on the results of the analysis, generates command data indicating movement of the control target using the servo motors 50.

[Step SC02] The time constant calculation unit 110 identifies the travel direction of the control target indicated by the command data created in step SC01, and calculates the optimal time constant using Equation (2) described above based on the identified travel direction and the set values for each axis (the speed limit, the acceleration limit, the jerk limit, and the like).

[Step SC03] The pre-interpolation acceleration and deceleration unit 120 executes a pre-interpolation linear acceleration and deceleration process on the command data created in step SC01 to generate the command data subjected to the pre-interpolation linear acceleration and deceleration process.

[Step SC04] Based on the optimal time constant for each command data calculated in step SC02, the time constant setting unit 130 determines whether or not the next command data involves an increased optimal time constant with respect to the optimal time constant for the command data processed during the current interpolation period. If the result of the determination indicates that the next command data does not involve an increased optimal time constant, the processing proceeds to step SC05. If the result of the determination indicates that the next command data involves an increased optimal time constant, the processing proceeds to step SC06.

[Step SC05] The time constant setting unit 130 adopts the optimal time constant for the command data processed during the current interpolation period, as a target time constant for the current interpolation period, and then the processing proceeds to step SC08.

[Step SC06] The time constant setting unit 130 calculates a position where time constant starts to be increased (the interpolation period when the time constant starts to be increased) taking into account the preset time constant range within which the time constant can be changed within one interpolation period.

[Step SC07] The time constant setting unit 130 adopts the optimal time constant for the next command data as the target time constant for the current interpolation period when the current interpolation period occurs after the position where time constant starts to be increased, calculated in step SC06.

[Step SC08] The time constant setting unit 130 compares the target time constant for the current interpolation period adopted in steps SC04 to SCO7 with the time constant for filter processing currently set in the filter processing unit 140. If the result of the comparison indicates that the target time constant for the current interpolation period is larger, the processing proceeds to step SC09. If the result of the comparison indicates that the target time constant for the current interpolation period is equal to the time constant for filter processing, the processing proceeds to step SC10. If the result of the comparison indicates that the target time constant for the current interpolation period is smaller, the processing proceeds to step SC11.

[Step SC09] The time constant setting unit 130 increases the time constant for filter processing currently set in the filter processing unit 140 within the preset time constant range in which the time constant can be changed within one interpolation period using the optimal time constant for the current interpolation period as an upper limit, and then the processing proceeds to step SC12.

[Step SC10] The time constant setting unit 130 shifts the processing to step SC12 without any change in the time constant for filter processing currently set in the filter processing unit 140.

[Step SC11] The time constant setting unit 130 reduces the time constant for filter processing currently set in the filter processing unit 140 within the preset time constant range in which the time constant can be changed within one interpolation period using the optimal time constant for the current interpolation period as a lower limit, and then the processing proceeds to step SC12.

[Step SC12] The filter processing unit 140 uses the time constant for filter processing set in steps SC09 to SC11 to execute filter processing on the command data subjected to the pre-interpolation linear acceleration and deceleration process which data has been generated in step SC03, to generate the filtered command data.

[Step SC13] The interpolation unit 150 generates interpolation data including points for the respective axes for each interpolation period with respect to the command data filtered in step SC12.

[Step SC14] The servomotor control unit 160 controls the servomotors 50 that drive the axes of the machine corresponding to the control target based on the interpolation data for each axis generated in step SC13.

In FIG. 13 and FIG. 14, for the time constant range within which the time constant can be changed within one interpolation period, the preset value is used without any change. However, for example, the magnitude of a shock occurring when the time constant is changed may be recorded so that the time constant range within which the time constant can be changed within one interpolation period can be adjustably reduced if the magnitude of the shock is larger than a preset allowable maximum value and that the time constant range within which the time constant can be changed within one interpolation period can be adjustably increased if the magnitude of the shock is smaller than a preset allowable minimum value. Such adjustment enables the time constant range within which the time constant can be changed within one interpolation period to be adjusted to the optimal value.

The embodiment of the present embodiment has been described. However, the present invention is not limited to the above-described example of the embodiment but may be implemented in various manners by appropriately modifying the embodiment.

The invention claimed is:

1. A numerical controller that controls axes in a machine based on a program to move a control target, the numerical controller comprising:
   a command analysis unit that looks ahead and analyzes commands indicated by a block contained in the program to output command data;
   a time constant calculation unit that identifies a travel direction of the control target for each of the commands based on the command data to calculate a time constant based on the identified travel direction and a set value, using the following equation:

$$\text{Minimal time constant required} = \max_{ix} \frac{\text{Acceleration in travel direction} \times \text{Direction cosine } (ix)}{\text{Allowable jerk } (ix)}$$

(where, an axis is denoted by ix);
   a pre-interpolation acceleration and deceleration unit that performs a linear acceleration and deceleration process on the command data;
   a time constant setting unit that sets a time constant for filter processing based on the time constant for each of the commands calculated by the time constant calculation unit;
   a filter processing unit that performs filter processing on the command data subjected to the linear acceleration and deceleration process by the pre-interpolation acceleration and deceleration unit, based on the time constant for filter processing set by the time constant setting unit; and
   an interpolation unit that calculates movement of each of the axes for each interpolation period based on the command data subjected to the filter processing by the filter processing unit.

2. The numerical controller according to claim 1, wherein, when a time constant different from a time constant currently set for filter processing is set as a new time constant for filter processing, the time constant setting unit sets a value of the time constant to be gradually changed.

3. The numerical controller according to claim 2, wherein, when the value of the time constant gradually changes, in a case where the time constant increases, the time constant setting unit increases the time constant before a processing target is switched from a command currently processed to a next command to be processed.

4. The numerical controller according to claim 2, wherein, a time constant range is preset within which the time constant is enabled to be changed within one interpolation period when the time constant is gradually changed, and the time constant setting unit dynamically adjusts the time constant range.

* * * * *